United States Patent
Knechtges

(10) Patent No.: US 10,029,658 B2
(45) Date of Patent: Jul. 24, 2018

(54) METHOD AND ASSEMBLY FOR BOOSTING THE BRAKE FORCE OF AN ELECTROHYDRAULIC MOTOR VEHICLE BRAKE SYSTEM

(71) Applicant: Lucas Automotive GmbH, Koblenz (DE)

(72) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/654,023

(22) PCT Filed: Nov. 28, 2013

(86) PCT No.: PCT/EP2013/074924
§ 371 (c)(1),
(2) Date: Jun. 19, 2015

(87) PCT Pub. No.: WO2014/095284
PCT Pub. Date: Jun. 26, 2014

(65) Prior Publication Data
US 2015/0344012 A1    Dec. 3, 2015

(30) Foreign Application Priority Data

Dec. 21, 2012 (DE) .................. 10 2012 025 292

(51) Int. Cl.
*B60T 7/04* (2006.01)
*B60T 13/68* (2006.01)
(Continued)

(52) U.S. Cl.
CPC ............ *B60T 7/042* (2013.01); *B60T 8/3265* (2013.01); *B60T 8/4077* (2013.01);
(Continued)

(58) Field of Classification Search
CPC ...... B60T 7/042; B60T 13/686; B60T 8/4077; B60T 8/3265; B60T 13/662; B60T 13/745
See application file for complete search history.

(56) References Cited

U.S. PATENT DOCUMENTS 6,099,085 A * 8/2000 Eckert ................. B60T 13/683
303/15
6,315,371 B1 * 11/2001 Wachi ..................... B60T 7/042
303/11
(Continued)

FOREIGN PATENT DOCUMENTS

CN    101039829 A    9/2007
CN    101659251 A    3/2010
(Continued)

OTHER PUBLICATIONS

State Intellectual Property Office of China, Search Report, Application No. 201380073187.1, dated Jan. 23, 2018.

*Primary Examiner* — Frederick M Brushaber
(74) *Attorney, Agent, or Firm* — MacMillan, Sobanski & Todd, LLC

(57) ABSTRACT

The invention relates to a technique for boosting the brake force of an electrohydraulic motor vehicle brake system in a mode in which, as a result of a mechanical push-through, an actuating force onto a brake pedal acts upon a master cylinder of the brake system. According to an aspect of this technique, the method comprises the steps of: determining a value of a first variable indicating a current deceleration of the vehicle; determining, based on the first variable, a value of a second variable indicating the actuating force; determining, based on the second variable, a required brake boost; and controlling an electromechanical actuator acting upon the master brake cylinder to obtain the required brake boost.

20 Claims, 3 Drawing Sheets

(51) Int. Cl.
*B60T 8/40* (2006.01)
*B60T 13/74* (2006.01)
*B60T 8/32* (2006.01)
*B60T 13/66* (2006.01)

(52) U.S. Cl.
CPC .......... *B60T 13/662* (2013.01); *B60T 13/686* (2013.01); *B60T 13/745* (2013.01)

(56) References Cited

U.S. PATENT DOCUMENTS

| | | | | |
|---|---|---|---|---|
| 6,322,164 | B1* | 11/2001 | Sakamoto | B60T 8/3275 303/114.3 |
| 6,332,164 | B1* | 12/2001 | Jain | H04L 51/12 709/203 |
| 7,890,240 | B2* | 2/2011 | Karnjate | B60T 7/06 188/106 F |
| 8,112,212 | B2* | 2/2012 | Bauerle | B60T 8/1837 701/70 |
| 8,468,820 | B2* | 6/2013 | Drumm | B60T 7/042 60/545 |
| 2002/0123837 | A1* | 9/2002 | Eccleston | B60T 7/20 701/70 |
| 2003/0116131 | A1* | 6/2003 | Majima | F02D 13/04 123/406.53 |
| 2004/0041464 | A1* | 3/2004 | Eckert | B60T 8/1708 303/7 |
| 2007/0001508 | A1* | 1/2007 | Schluter | B60T 7/042 303/114.3 |
| 2007/0233351 | A1* | 10/2007 | Wang | B60T 7/122 701/70 |
| 2007/0251217 | A1* | 11/2007 | Majima | F02D 13/04 60/285 |
| 2008/0116740 | A1* | 5/2008 | Yokoyama | B60T 7/042 303/20 |
| 2008/0265662 | A1* | 10/2008 | Karnjate | B60T 7/06 180/65.27 |
| 2009/0115244 | A1* | 5/2009 | Schluter | B60T 8/4077 303/114.1 |
| 2010/0164276 | A1* | 7/2010 | Schluter | B60T 7/042 303/15 |
| 2010/0263367 | A1* | 10/2010 | Drumm | B60T 7/042 60/545 |
| 2011/0178687 | A1* | 7/2011 | Anderson | B60T 13/745 701/70 |
| 2011/0190998 | A1* | 8/2011 | Kato | B60T 7/22 701/70 |
| 2011/0291470 | A1* | 12/2011 | Drumm | B60T 1/10 303/3 |
| 2013/0147259 | A1 | 6/2013 | Linkenbach et al. | |
| 2013/0169033 | A1* | 7/2013 | Svensson | B60T 13/161 303/10 |
| 2013/0199364 | A1 | 8/2013 | Weiberle et al. | |
| 2014/0197680 | A1 | 7/2014 | Gilles | |
| 2015/0008726 | A1* | 1/2015 | Minami | B60T 8/885 303/14 |
| 2015/0217741 | A1* | 8/2015 | Kikawa | B60L 7/18 701/71 |

FOREIGN PATENT DOCUMENTS

| | | |
|---|---|---|
| CN | 101868385 A | 10/2010 |
| DE | 102004016141 A1 | 10/2005 |
| DE | 102010042694 A1 | 2/2012 |
| DE | 102011081461 A1 | 3/2012 |
| DE | 102011101066 A1 | 11/2012 |
| WO | 2010069656 A1 | 6/2010 |

\* cited by examiner

METHOD AND ASSEMBLY FOR BOOSTING THE BRAKE FORCE OF AN ELECTROHYDRAULIC MOTOR VEHICLE BRAKE SYSTEM

CROSS-REFERENCE TO RELATED APPLICATIONS

This application is the National Phase of International Application PCT/EP2013/074924, filed Nov. 28, 2013 which designated the U.S. and was published on Jun. 26, 2014 as International Publication Number WO 2014/095284 A2. PCT/EP2013/074924 claims priority to German Patent Application No. 10 2012 025 292.7, filed Dec. 21, 2012. The disclosures of both applications are incorporated herein by reference.

BACKGROUND OF THE INVENTION

The present disclosure relates generally to the field of motor vehicle brake systems. Specifically, a method and an electrohydraulic actuating assembly, for boosting the brake force in the case of such a brake system, are described.

In the case of an electrohydraulic brake system, the braking intention of a driver is usually sensed by means of a sensor in the region of a brake pedal and converted into an electrical signal. The electrical signal is supplied to a control unit, which then, on the basis of the signal, controls an electrical brake-pressure generator having an electromechanical actuator for generating brake force or assisting brake force.

Such a brake system is referred to as a "brake-by-wire" system if the brake force is generated exclusively by the electrical brake-pressure generator. By contrast, if the brake force generated by the driver is merely increased by means of the electrical brake-pressure generator, the term electrohydraulic brake force boost is used.

In order that the vehicle can still be decelerated even in the event of a defect or failure of the vehicle electrics, a "brake-by-wire" system normally has a redundant hydraulic emergency braking functionality (cf. DE 10 2004 016 141 A1). In this case, in a fallback mode, the actuating force generated on the brake pedal by the driver is transmitted directly to a brake master cylinder of the brake system by means of a mechanical push-through. In this way, a direct connection is produced between the brake pedal and the wheel brakes of the motor vehicle. Owing to the mechanical push-through the fallback mode is also referred to as "push-through" operation.

In the fallback mode of a "brake-by-wire" system, there is no control of the electrical brake-pressure generator. The deceleration of the vehicle must therefore be effected solely by means of the (unboosted) actuating force on the brake pedal. In the case of heavy vehicles, in particular, this results in excessively long braking distances.

In practice, it has been found that even a simple error of the sensor for detection of a braking request can result in deactivation of the electrical brake pressure generator. Although the electrical brake pressure generator as such would therefore still be able to operate, in these cases the vehicle has to be braked solely by the actuating force on the brake pedal. This applies both to "brake-by-wire" systems and to electrohydraulic brake force boosting systems with permanent mechanical push-through.

SUMMARY OF THE INVENTION

Therefore, a technique for boosting the brake force of an electrohydraulic motor vehicle brake system is to be provided, that can reliably provide a brake force boost, even in a mode in which an actuating force on a brake pedal acts upon a brake master cylinder of the brake system by means of a mechanical push-through.

According to one aspect, a method is therefore specified for boosting the brake force for an electrohydraulic motor vehicle brake system, in a mode in which an actuating force on a brake pedal acts upon a brake master cylinder of the brake system by means of a mechanical push-through. The method comprises the steps of: determining a value of a first variable that is indicative of a current vehicle deceleration; on the basis of the value of the first variable, determining a value of a second variable that is indicative of the actuating force; on the basis of the value of the second variable, determining a required brake force boost; and controlling an electromechanical actuator, which acts upon the brake master cylinder, to achieve the required brake force boost.

The current vehicle deceleration may result from two or more components, in particular from the actuating force in the case of the brake pedal and from a current brake force boost by means of the electromechanical actuator. In this case, both the actuating force on the brake pedal and the current brake force boost may act, as additive force components, upon the brake master cylinder.

The value of the second variable may be determined from the value of the first variable and the current brake force boost. The current brake force boost, in turn, may be determined from the electric current consumption of the electromechanical actuator or in another way (for example, from an actuating path or from a number of revolutions of the electromechanical actuator). In the case of the method being executed cyclically, the current brake force boost for a current cycle may be determined from required brake force boost determined for a previous cycle.

The determination of the value of the second variable may be based on the assumption of a known relationship between the current brake force boost and the actuating force. Similarly, the determination of the required brake force boost may be based on the assumption of a known relationship between the required brake force boost and the second variable. In each of these two cases, the known relationship may be a known (e.g. linear) function. In the simplest case, there is a predefined proportionality (e.g. n:1) between the current, or required, brake force boost, on the one hand, and the actuating force, or second variable, on the other hand.

The first variable may be the vehicle deceleration—i.e. a (negative) acceleration—, a distance travelled by a piston in the brake master cylinder, a hydraulic pressure in the brake system (e.g. downstream from the brake master cylinder) or a total brake force (e.g. on a wheel brake). The second variable may be the actuating force itself, a hydraulic pressure component in the brake system that results from the actuating force, or a brake force component that results from the actuating force.

One or more of the steps of the method presented here may be performed repeatedly during a braking operation. For example, the steps may be performed cyclically, in such a manner that the required brake force boost that is determined in a previous cycle is used as a current brake force boost for the next cycle.

The push-through mode—and consequently the execution of one or more steps of the method presented here—may be activated during an ongoing braking operation. Thus, in one implementation of the push-through mode, there may be a fallback mode (e.g. to provide an emergency braking functionality in the case of a "brake-by-wire" system). In addition to this fallback mode, a regular operating mode may be defined, in which the brake pedal is decoupled from the brake master cylinder, and a brake force is generated solely by the electromechanical actuator. As an alternative to this, the brake system may be permanently in the push-through mode. In other words, the mechanical push-through may (also) prevail in the regular operating mode of the motor vehicle brake system (for example, in the case of a system for electrohydraulic brake force boosting).

Additionally specified is a computer program product having program code means for performing the method presented here, when the method is executed on a control unit. A control unit comprising the computer program product is also provided. The control unit may additionally comprise one or more processors, on which the computer program product is executed. The computer program product may be stored in the control unit.

Finally, an electrohydraulic actuating assembly for a motor vehicle brake system is specified. The actuating assembly comprises a brake master cylinder, an electromechanical actuator (at least) for boosting brake force, the electromechanical actuator acting upon the brake master cylinder, a component that, by means of a mechanical push-through, causes an actuating force on a brake pedal to be transmitted to the brake master cylinder, and a control unit. The control unit is designed to determine a value of a first variable that is indicative of a current vehicle deceleration; to determine, on the basis of the value of the first variable, a value of a second variable that is indicative of the actuating force; to determine, on the basis of the value of the second variable, a required brake force boost; and to control the electromechanical actuator to achieve the required brake force boost.

The electromechanical actuator may act directly or indirectly on the brake master cylinder. Specifically, the electromechanical actuator may be mechanically coupled, or able to be mechanically coupled, to a piston accommodated in a displaceable manner in the brake master cylinder. The electromechanical actuator can then directly actuate the piston for the purpose of boosting brake force. As an alternative to this, the electromechanical actuator may act in combination with a further cylinder-piston means of the brake system that is fluidically coupled, on the outlet side, to the brake master cylinder. In this case, a piston that is accommodated in a displaceable manner in the brake master cylinder can be actuated hydraulically by means of a hydraulic pressure provided by the cylinder-piston means (and assisted by the electromechanical actuator).

The component may be configured for operation in a fallback mode of the actuating assembly. Moreover, the actuating assembly may be configured, in a regular operating mode, to decouple the brake pedal from the brake master cylinder, and to generate a brake force solely by means of the electromechanical actuator.

According to one implementation, the actuating assembly is realized without a sensor for detection of a braking request. According to this implementation, there may be a permanent mechanical push-through for transmitting the actuating force on the brake pedal to the brake master cylinder, in which case the brake force boost can then act additively upon the brake master cylinder.

Other advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
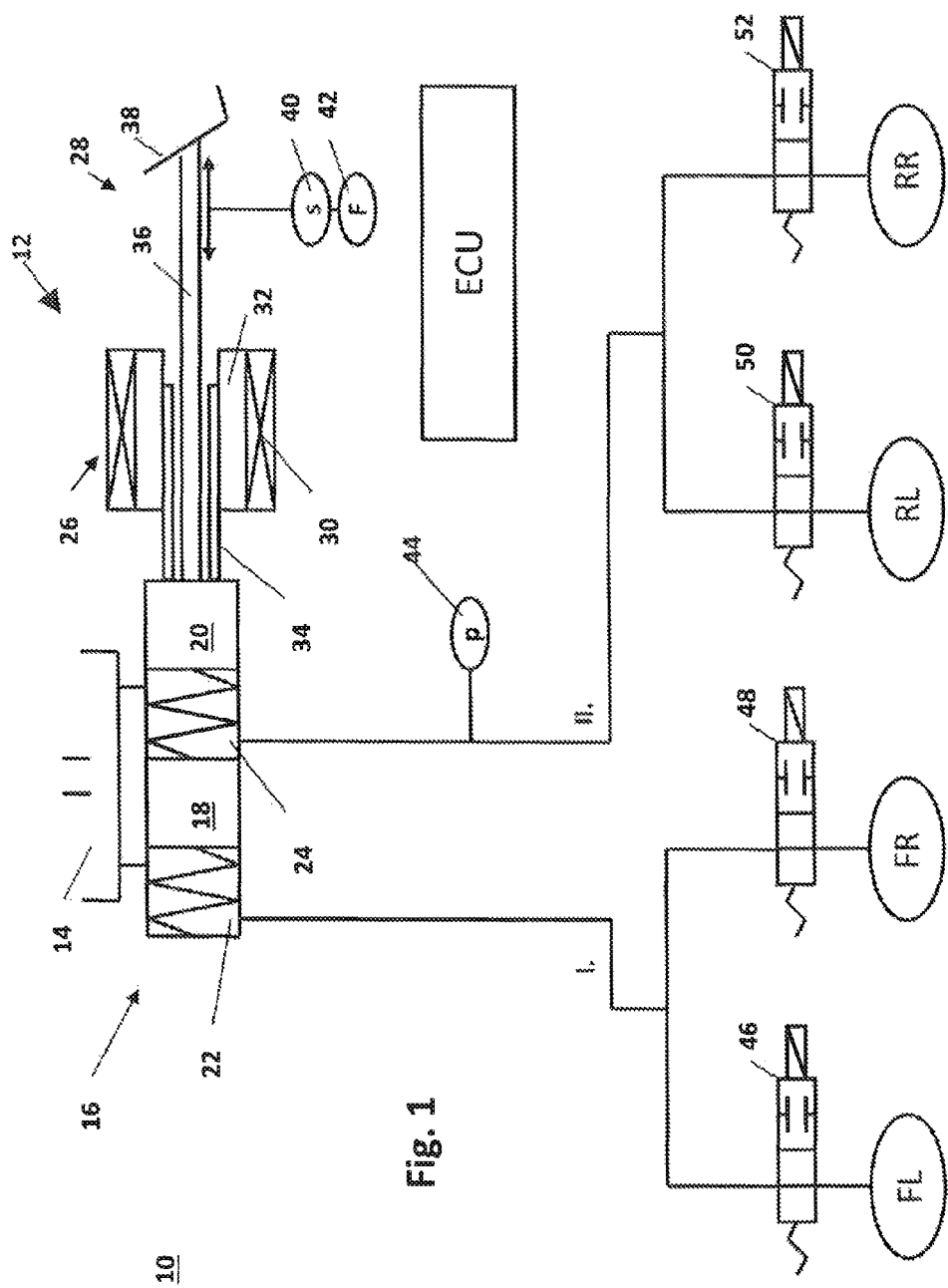
FIG. 1: an embodiment of a motor vehicle brake system having an electrohydraulic actuating assembly.

The electrohydraulic motor vehicle brake system 10 represented in FIG. 1 comprises an electrohydraulic actuating assembly 12, which operates by means of a hydraulic fluid. Some of the hydraulic fluid is stored in an unpressurized container 14. The container 14 is connected to a brake master cylinder 16, in which brake pressures are generated by pressurizing the hydraulic fluid. For this purpose, two movable pistons 18 and 20, which delimit two hydraulic chambers 22 and 24 that are separate from each other, are accommodated, as a tandem arrangement, in the brake master cylinder 16. Two brake circuits I. and II. are connected to outputs of the chambers 22, 24, each brake circuit acting upon two of a total of four wheel brakes FL (front left), FR (front right), and RL (rear left), RR (rear right).

Depending on which wheel brake is actuated via which brake circuit, there is a front/rear axle division, which means that the one brake circuit actuates the wheel brakes of the front axle, and the other brake circuit actuates those of the rear axle, or there is a diagonal division, which means that each brake circuit actuates the wheel brake of a front wheel and that of the diagonally opposite rear wheel. A front/rear axle division is shown exemplarily in FIG. 1.

Actuation of the brake master cylinder 16 may be effected by means of an electromechanical actuator 26 (as an electrical brake pressure generator) and a mechanical final control element 28 (as a mechanical brake pressure generator), jointly or separately from each other. For this purpose, both the electromechanical actuator 26 and the mechanical final control element 28 act, on the input side, upon the end face of the piston 20 that is opposite the hydraulic chamber 24, in order to cause the pistons 18 and 20 (because of their tandem arrangement) to be moved longitudinally.

As an alternative to this, the electromechanical actuator 26 may act in combination with a cylinder-piston means that is fluidically coupled to the brake master cylinder 16, in order to actuate the pistons 18, 20 electrohydraulically (not represented in FIG. 1). Specifically, for example, the cylinder-piston means acting in combination with the electromechanical actuator 26 may be fluidically coupled, on the outlet side, to the piston 20 of the brake master cylinder 16, in such a manner that a hydraulic pressure in the cylinder-piston means that is generated upon actuation of the actuator 26 acts directly upon the end face of the piston 20 that is opposite the hydraulic chamber 24. The piston 20 is then made to move longitudinally, because of the hydraulic pressure acting upon the piston 20. The hydraulic pressure generated in the cylinder-piston means by the electromechanical actuator 26 may be used solely to actuate the piston 20 in the brake master cylinder 16 or, in the course of a brake force boost, to assist the piston actuation effected by means of the mechanical final control element 28.

The electromechanical actuator 26 comprises an electric motor 30 that, via a transmission 32, 34, acts upon the piston 20 on the input side. The electric motor 30 and the transmission 32, 34 are disposed concentrically in relation to each other, the transmission 32, 34 being realized, for example, as a nut/spindle arrangement, which preferably has a recirculating ball means. The nut 32 of the transmission is rotatably mounted, and the transmission spindle 34 acting upon the piston 20 is mounted in a rotationally fixed manner, in order to convert rotary motions of the electric motor 30 into longitudinal motions of the spindle 34, and therefore of the pistons 18 and 20. Generally, the transmission 32, 34 may be designed to convert rotary motions of the electric motor 30 into a longitudinal motion acting upon the piston 20.

The mechanical final control element 28 has an actuating member 36, which is disposed so as to be displaceable in the longitudinal direction, concentrically in relation to the electric motor 30. The actuating member 36, which is coupled in a jointed manner to the brake pedal 38, is able, like the spindle 34 (and independently thereof), to act upon the piston 20 on the input side, in order cause the pistons 18 and 20 to move longitudinally.

Whether actuation of the brake master cylinder 16 is effected by means of the electromechanical actuator 12 and/or by means of the mechanical final control element 28 can be selected by means of a coupling and decoupling means (not represented). If, according to one implementation, the mechanical final control element 28 is fully decoupled from the brake master cylinder 16, for a "brake-by-wire" operation (service brake mode) the brake master cylinder 12 is actuated exclusively by means of the electromechanical actuator 20. For this purpose, the actuating travel s and the associated actuating force F imitated on the brake pedal 38 by the driver are sensed by means of two sensor means 40 and 42. In addition, a pedal reaction behaviour is provided by means of a simulation means (not represented) upon actuation of the brake pedal 38. It must be pointed out that, in alternative embodiments, one or both of the sensor means 40 and 42 may be omitted.

In an electronic control unit ECU, the sensed actuating travel s and the associated actuating force F are evaluated to determine the brake pressure requirement (i.e. the braking intention) of the driver. The electronic control unit ECU effects the electrical control of the electric motor 30 of the electromechanical actuator 26 in dependence on the brake pressure requirement. The brake pressure p generated upon actuation of the brake master cylinder 16 is sensed by means of a sensor means 44, and in the electronic control unit ECU is cyclically compared with the brake pressure requirement in order to control the brake pressure p by closed-loop or open-loop control. Since, owing to the tandem arrangement of the pistons 18 and 20 of the brake master cylinder 16, a (substantially) corresponding brake pressure p is generated for both brake circuits I. and II., sensing of the brake pressure p requires only one sensor means 44, which in this case senses the brake pressure p generated in brake circuit II.

Should a defect of the electromechanical actuator 26 occur, for example a fault in the electrical control of the electric motor 30, or a malfunction of one of the sensor means 40 and 42 for detecting of a braking request, it becomes possible for the brake master cylinder 16 to be actuated directly, by means of the coupling and decoupling means (not represented), in dependence on an actuation of the brake pedal 38, in order to ensure an emergency braking operation (fallback mode).

As described, in the fallback mode, owing to the mechanical push-through, the actuating force applied on the brake pedal 38 by the driver acts directly upon the brake master cylinder 16. In other words, the brake pedal 38 is rigidly coupled to the end face of the cylinder 20 that faces towards the brake pedal 38, via the actuating member 36. Depending on the defect or malfunction, control of the electromechanical actuator 12 is additionally effected in this case, in order to provide an additive brake force boost. This is described in greater detail below.

In the hydraulic connection to the brake master cylinder 16, a valve arrangement 46, 48, 50 and 52 is assigned, respectively, to each of the wheel brakes FL, FR, RL and RR. The valve arrangements 46, 48, 50 and 52 are each designed as electromagnetically actuated 2/2-way valves, which are open in the non-actuated state (as represented). The electrical control of the valve arrangements 46, 48, 50 and 52 is likewise effected by the electronic control unit ECU.

In the present embodiment, the setting of individual brake pressures in the individual wheel brakes FL, FR, RL and RR, as is required, inter alia, for an anti-lock braking system (ABS), a traction control system (TCS), a dynamic drive control system (ESP) and the like, is effected in multiplex mode.

In multiplex mode, the setting of the individual wheel brake pressures is effected, for example, within multiplex cycles Tz, which succeed one another with a cycle time in an order of magnitude of typically 10 ms. In this case, a current multiplex cycle Tz(n) is divided, according to the number of wheel brakes FL, FR, RL and RR to be actuated, into time intervals (of equal duration), in which the brake pressures required for the wheel brakes FL, FR, RL and RR are set centrally in succession by the brake pressure generator 10 and, by means of the valve arrangement 46, 48, 50 and 52 assigned to the respective wheel brake FL, FR, RL and RR, are held until the succeeding multiplex cycle (Tz(n+1). Consequently, in the case of four wheel brakes FL, FR, RL and RR to be operated, there are (at least) four time intervals.

As already mentioned, the fallback mode may be activated in various situations, for example because of a fault in the electrical control of the electric motor 30, or because of a malfunction of one of the sensor means 40 and 42 for detecting of a braking request. If only one of the sensor means 40 and 42 fails, or if there is a comparable defect, the electromechanical actuator 26 as such remains operational. In such cases, therefore, it is provided that the electromechanical actuator 26 is operated in addition to the mechanical push-through, in order to provide a brake force boost. The known problem of excessively long braking distances in the fallback mode can be solved in this way.

The solution proposed here includes an assessment of the driver's intention (in the case of, for example, a defect of both sensor means 40 and 42) and, based thereon, a determination of the required brake force boost. The assessment may be based on the assumption of a known relationship between the required brake force boost and the (unknown) actuating force applied by the driver. Generally, the solution proposed in the present embodiment is based on the knowledge that, if the result (e.g. vehicle deceleration or brake pressure) of two actions is known and, in addition, one of the two actions (e.g. the brake force boost) is known), the second of the two actions (e.g. the actuating force applied by the driver) can be determined, and the required brake force boost can be determined therefrom.

This situation is now explained with reference to the schematic flow diagram according to FIG. 2. In this connection, reference is also made to FIG. 3, which illustrates an embodiment of a method for boosting brake force in combination with the brake system according to FIG. 1.

Figure 2:
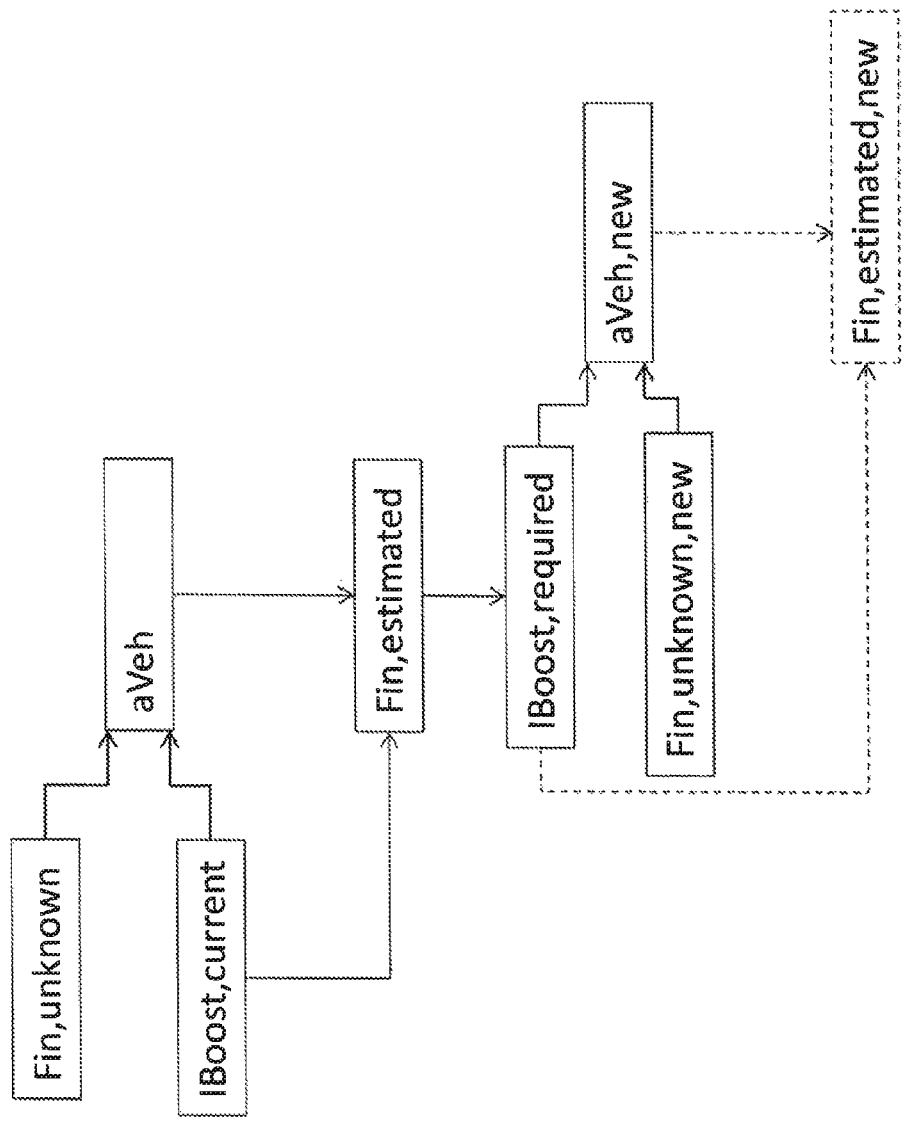
FIG. 2 a schematic representation of the determination of the required brake force boost for the purpose of controlling an electromechanical actuator of the actuating assembly according to FIG. 1.

The procedure represented in FIG. 2 can be started if, for example in the context of a braking operation (i.e. in the case of an electromechanical actuator 26 controlled by the control unit ECU) the need to activate the fallback mode is identified, assuming at the same time that the electromechanical actuator 26 is able to continue to operate. Such a situation may exist, for example, in the case of failure of one or more of the sensor means 40, 42 for detection of a braking request. In such a case, upon activation of the fallback mode, the mechanical push-through also becomes activated, in which case the brake force boost (still) provided by the electromechanical actuator 26 and the actuating force resulting from the mechanical push-through can then act additively upon the piston 20 in the brake master cylinder 16, at least for a short time. The input variable for controlling the electromechanical actuator 26 is absent, however, and can be filled in as described in the following.

It is assumed according to FIG. 2 that the current vehicle deceleration $a_{Veh}$ in the fallback mode results from two components, namely, on the one hand—owing to the mechanical push-through—the (now unknown) actuating force on the brake pedal 38 $F_{in}$ and, on the other hand, the brake force boost (currently) provided by the electromechanical actuator 26. There is a known relationship between the brake force boost and the electric current consumption $I_{Boost}$ of the electromechanical actuator 26.

It is additionally assumed that there is also a known relationship between the current brake force boost (i.e. the electric current consumption $I_{Boost}$), on the one hand, and the actuating force $F_{in}$ generated by the driver, on the other hand. This known relationship may be a predefined boost factor. For example, the brake system 10 may be designed to boost the actuating force $F_{in}$ generally by a factor 4.

Figure 3:
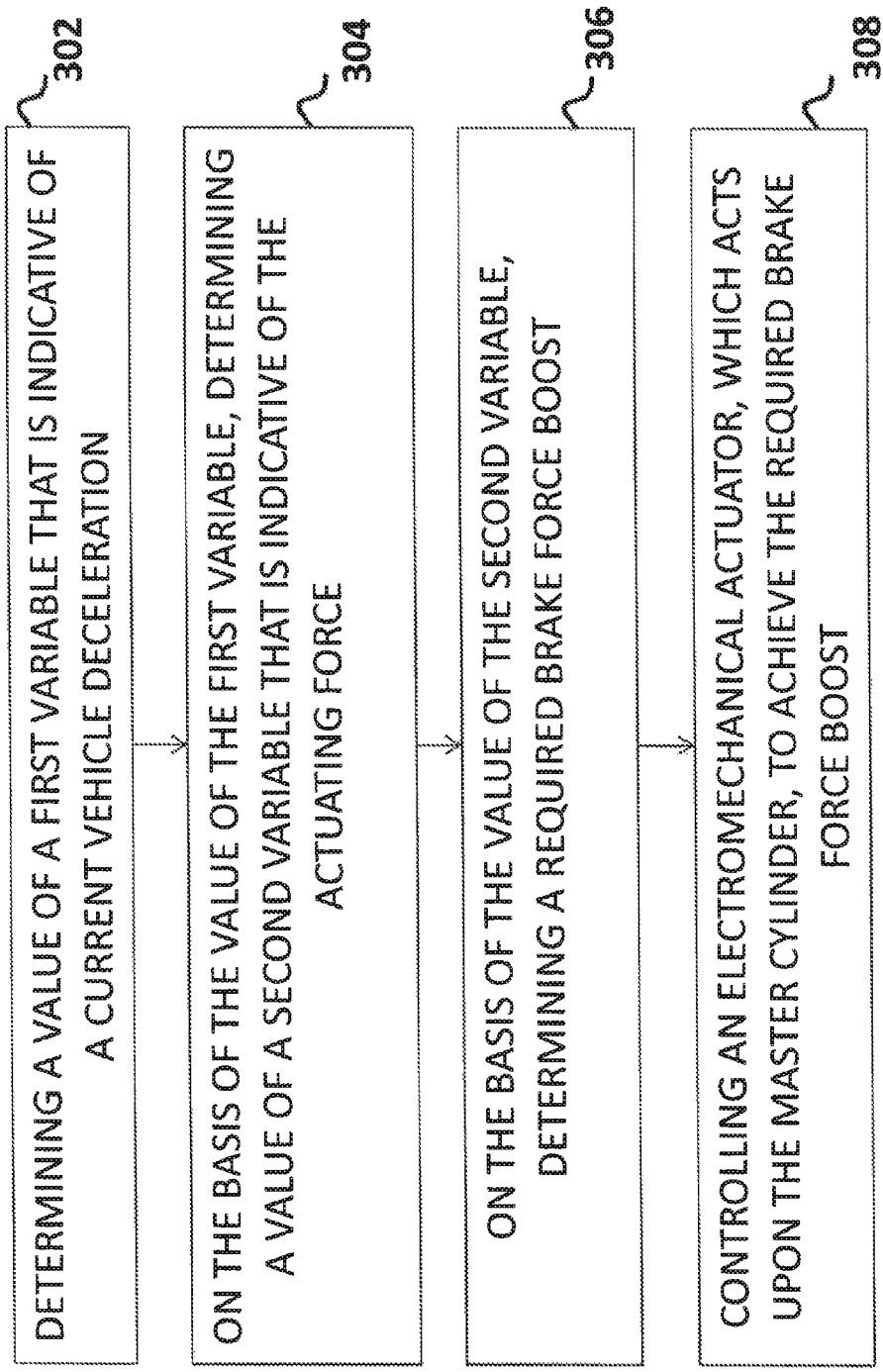
FIG. 3 an embodiment of a method for boosting the brake force of the motor vehicle brake system according to FIG. 1.

The current vehicle deceleration $a_{Veh}$ may be determined, for example, by means of an acceleration sensor or wheel rotational-speed sensor, by means of a displacement sensor that senses the movement of one of the pistons 18, 20, by means of the pressure sensor 44 or by means of a brake force sensor (step 302 in FIG. 3). The current brake force boost may be determined, as described above, by means of the electric current consumption $I_{Boost}$ of the electromechanical actuator 26, or in another way. From this information, despite failure of the displacement sensor 40 and/or of the force sensor 42, the actuating force $F_{in}$ can then be estimated—as represented in FIG. 2—(step 304 in FIG. 3).

Considered for the purpose of estimating the actuating force $F_{in}$ is the balance of forces ensuing at the piston 20 that delimits the hydraulic chamber 24, the sensor means 44 being connected to the output of the latter for the purpose of sensing the brake pressure p. This is obtained on the basis of the hydraulic force $F_p$ generated in the hydraulic chamber 24, the actuating force $F_{in}$ and the boost force $F_{Boost}$ provided by the electromechanical actuator 26:

$$F_p = F_{in} + F_{Boost}$$

This results in the actuating force $F_{in}$:

$$F_{in} = F_p - F_{Boost}$$

The hydraulic force $F_p$ is obtained as the product of the operating pressure p, sensed by means of the sensor means 44, and the effective working area $A_{20}$ of the piston 20, as constants:

$$F_p = A_{20} * p$$

The boost force $F_{Boost}$ is obtained as the product of the electric current consumption $I_{Boost}$ of the electric motor 30 and the constant $K_{30}$ defined by the characteristic values of the electric motor 30 and of the transmission 32, 34:

$$F_{Boost} = K_{30} * I_{Boost}$$

The input force $F_{in}$ can thus be estimated, or calculated, according to the following formula:

$$F_{in} = A_{20} * p - K_{30} * I_{Boost}$$

From the estimated actuating force $F_{in}$, in turn, since the boost factor is known, it is possible to deduce the brake force boost required for the next cycle, and the therewith associated electric current consumption $I_{Boost}$ of the electromechanical actuator 26. This procedure corresponds to step 306 in FIG. 3. In a further step, 308, the electromechanical actuator 26 is then controlled by means of the control unit ECU to achieve the required brake force boost.

In the meantime, the driver will have changed the actuating force on the brake pedal 38 (in an unknown manner), such that a new actuating force $F_{in}$ is present. Accordingly, a new vehicle deceleration $a_{Veh}$ ensues. Then, in a next cycle—as indicated by broken lines in FIG. 2—the new actuating force $F_{in}$ can be estimated on the basis of the new vehicle deceleration $a_{Veh}$ and the newly set brake force boost.

The steps represented in FIG. 2 are repeated cyclically until an end of the braking request has been detected (i.e. the estimated actuating force is zero or close to zero).

The procedure outlined in FIG. 2 may also be started if there is no sensor means 40, 42 at all for detection of a braking request or, alternatively, if the corresponding sensor means 40, 42 has (have) already failed in the lead-up to a braking operation. In this case, it is simply assumed at the start that the current brake force boost and the associated energizing of the electromechanical actuator 26 (i.e. $I_{Boost}$) are equal to zero, and the current vehicle deceleration therefore results exclusively from the mechanical push-through.

It is understood that the implementation of the procedure outlined here is equally suited to boosting the brake force in the case of a brake system 10 in which a mechanical push-through is always present. In the case of such brake systems, it would therefore also be possible to dispense with one or both of the sensor means 40 and 42 for detection of a braking request.

As is evident from the embodiments described, the procedure proposed here makes it possible to maintain a brake force boost even in such cases in which, conventionally, an unboosted "push-through" operation would be effected in the fallback mode. Unnecessary or precautionary switch-off of the electromechanical actuator 26 can therefore be precluded. Overall, therefore, there are very few remaining cases of fault in which there is no brake force boost available and the driver himself/herself has to apply the entire brake force. The everyday usefulness of "brake-by-wire" systems and systems for electrohydraulic boosting of brake force is thereby increased.

When the procedure proposed here is implemented, the known and accustomed pedal feel may change; in particular, the pedal travel may lengthen by a reasonable extent. This is advantageous, however, since this also provides the driver with a haptic indication that the brake system possibly has to be checked for a fault.

Finally, it must also be mentioned that a practical embodiment has been explained exemplarily on the basis of FIGS. 1 to 3. It is therefore at the discretion of persons skilled in the art to effect modifications and combinations within the scope of the claims and the description.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit of scope.

The invention claimed is:

1. Method for boosting a brake force of an electrohydraulic motor vehicle brake system in a mode in which an actuating force on a brake pedal acts upon a brake master cylinder in which brake pressures are generated by pressurizing a hydraulic fluid of the brake system by a mechanical push-through, comprising the steps:
   determining a value of a first variable that is indicative of a current vehicle deceleration;
   on the basis of the value of the first variable, determining a value of a second variable that is indicative of the actuating force;
   on the basis of the value of the second variable, determining a required brake force boost; and
   controlling an electromechanical actuator, which acts upon the master cylinder, to achieve the required brake force boost.

2. Method according to claim 1, the current vehicle deceleration resulting from the actuating force on the brake pedal and a current brake force boost from the electromechanical actuator.

3. Method according to claim 2, the value of the second variable being determined from the value of the first variable and the current brake force boost.

4. Method according to claim 3, the current brake force boost being determined from an electric current consumption of the electromechanical actuator.

5. Method according to claim 3, the determination of the value of the second variable being based on the assumption of a known relationship between the current brake force boost and the actuating force.

6. Method according to claim 1, the determination of the required brake force boost being based on the assumption of a known relationship between the required brake force boost and the second variable.

7. Method according to claim 1, the first variable being the vehicle deceleration itself, a distance traveled by a piston in the brake master cylinder, a hydraulic pressure in the brake system or a total brake force.

8. Method according to claim 1,
   the second variable being the actuating force itself, a hydraulic pressure component in the brake system that results from the actuating force, or a brake force component that results from the actuating force.

9. Method according to claim 1, the steps being performed repeatedly during a braking operation.

10. Method according to claim 1, the mode being activated during an ongoing braking operation.

11. Method according to claim 1, the mode being a fallback mode and, in a regular operating mode, the brake pedal being decoupled from the brake master cylinder and a brake force being generated solely by the electromechanical actuator.

12. Method according to claim 1, the method being performed as a response to a failure of a sensor for detection of a braking request.

13. Method according to claim 12, the method being performed as a response to the failure of a pedal travel sensor.

14. Method according to claim 1, wherein each step is performed by a program code means of a computer program, the method including the step of executing the program code means of the computer program on a control unit (ECU).

15. Method according to claim 1, wherein the actuating force relates to the force by means of which a driver operates the brake pedal.

16. Control unit (ECU) of a motor vehicle, comprising a computer program product having a program code that instructs the control unit to generate an output signal to an electromechanical actuator to boost a brake force of an electrohydraulic motor vehicle brake system in a mode in which an actuating force on a brake pedal acts upon a brake master cylinder of the brake system by a mechanical push-through, the ECU receiving a signal from a sensor and the program code determining a value of a first variable based on the sensor signal that is indicative of a current vehicle deceleration;
   on the basis of the value of the first variable, the program code determines a value of a second variable that is indicative of the actuating force;
   on the basis of the value of the second variable, the program code determines a required brake force boost; and
   the ECU generates the output signal to control the electromechanical actuator to act upon the master cylinder, to achieve the required brake force boost.

17. Method according to claim 16, wherein the actuating force relates to the force by means of which a driver operates the brake pedal.

18. Electrohydraulic actuating assembly for a motor vehicle brake system, comprising
   a brake master cylinder;
   an electromechanical actuator at least for boosting brake force, the electromechanical actuator acting upon the brake master cylinder;
   a component that, by means of a mechanical push-through, enables an actuating force on a brake pedal to be transmitted to the brake master cylinder; and
   a control unit (ECU), which is designed
   to determine a value of a first variable that is indicative of a current vehicle deceleration;
   to determine, on the basis of the value of the first variable, a value of a second variable that is indicative of the actuating force;
   to determine, on the basis of the value of the second variable, a required brake force boost; and
   to control the electromechanical actuator to achieve the required brake force boost.

19. Actuating assembly according to claim 18, the component being configured for operating in a fallback mode, and the actuating assembly being configured, in a regular operating mode, to decouple the brake pedal from the brake master cylinder, and to generate a brake force solely by the electromechanical actuator.

20. Actuating assembly according to claim 18, the actuating assembly being realized without a sensor for detection of a braking request.

* * * * *